Patented Feb. 17, 1953

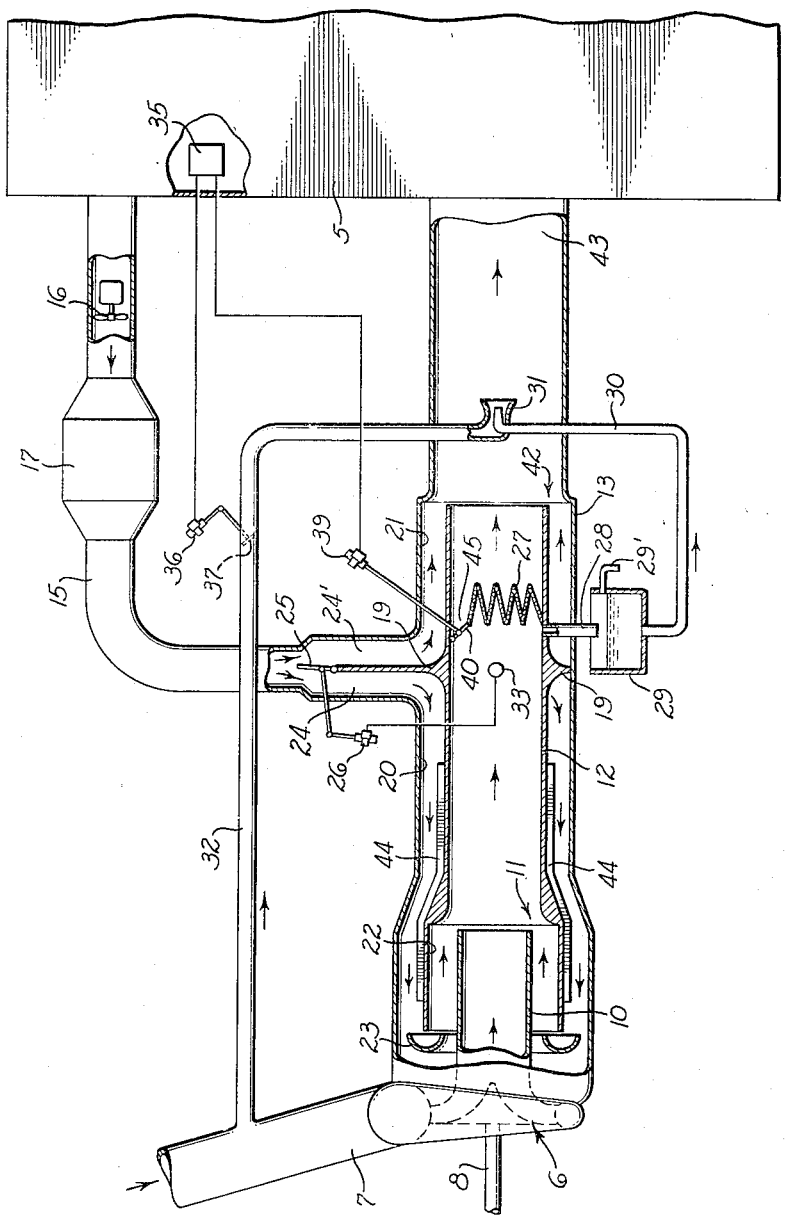

2,628,481

UNITED STATES PATENT OFFICE 2,628,481

MEANS FOR MAINTAINING UNRESTRICTED FLOW OF REFRIGERATING AIR THROUGH DUCTS OR THE LIKE

Paul C. Scofield, Glendale, and Frederick H. Green, Los Angeles, Calif., assignors to The Garrett Corporation, Los Angeles, Calif., a corporation of California Application February 4, 1949, Serial No. 74,626

24 Claims. (Cl. 62—6)

This invention relates generally to air refrigerating systems and particularly to such a system wherein air cooled to a temperature below freezing is conveyed through a duct. Specifically, the invention pertains to a device, adapted for use in connection with an air refrigerating system, for preventing the accretion of entrained ice particles and ice fog within the air flow duct so as to maintain an unrestricted flow of the cooled air through the duct.

The present device has particular utility when employed in connection with an air refrigerating system for ventilating and cooling the cabin or cockpit of an aircraft, but it is to be understood that the device may be advantageously utilized in various other air cycle systems for ventilating and refrigerating other areas. In its broadest aspect, this invention is concerned primarily with means for preventing the accretion of ice particles and ice fog within any cold air duct, such as the outlet duct of a cooling turbine. The specific embodiment herein disclosed is, therefore, to be regarded merely as a typical example of the many possible applications of the device to use.

Under certain operating conditions, it is highly desirable, and more or less essential, that the cabins or cockpits of aircraft be supplied with refrigerated ventilation air. For example, as a general rule refrigeration is required only from sea level up to an altitude of approximately 15,000 feet above sea level, such a conditioning of the air being especially desirable when the aircraft is flying in tropical conditions of relatively high temperatures and humidity. Various systems have been proposed for carrying out the air refrigerating and circulating process. In the case of a turbine-powered aircraft, compressed air is bled off from the main compressor for cabin ventilation and/or pressurization purposes. In the case of a reciprocating-engine-powered aircraft, an auxiliary cabin supercharger is driven by the engine and furnishes such cabin air. In either case, the air is relatively hot and compressed to a pressure somewhat above that necessary for the purpose, and in such cases it is common to provide means for cooling or refrigerating the air and reducing its pressure to a useful level, the so-called "air cycle" refrigerating systems being the most commonly used. While such air conditioning systems may comprise various components arranged in innumerable ways, all such systems are based upon the principle of utilizing the expansion of air in a turbine to reduce its temperature substantially below compressor or supercharger outlet values. While other means have been proposed for cooling aircraft cabins, the weight and bulk of equipment used in such systems have been prohibitive and for this reason, among others, the air cycle system of cooling is preferred. The present invention is largely concerned with consideration of aircraft in which any source of compressed air is available, the air being forced through a duct for cabin or cockpit ventilation and/or pressurization purposes.

One object of the present invention is to provide means for preventing the accumulation of entrained ice particles and ice fog in the discharge duct of a turbine which may or may not be used in connection with an air refrigerating system.

Another object of the invention is to provide means for converting into water such ice particles and ice fog as may be entrained in the turbine discharge air, this means being used, when desired, in connection with a water separator means for removing the water from the air stream.

Another object is to provide a device adapted for use in connection with an air refrigerating system and capable of recirculating a selected portion of the ventilating air in an aircraft cabin by introducing that selected portion into the device covered by this invention, the recirculated air in its heated condition being utilized as a means for imparting to the ice particles and ice fog the latent heat of fusion necessary to melt them.

Another object is to provide a device or apparatus which functions to maintain the cooling energy loss of the air in its passage through the separator at a minimum.

A further object of the invention is to provide means for reinjecting into the refrigerated air duct at a point downstream from the water separator such amounts of water as are necessary to maintain controlled conditions of humidity within the cabin or cockpit.

A still further object is to provide means for maintaining unrestricted flow of refrigerating air through a duct or the like, this means being highly efficient in operation and comprising an assembly of simple components, the assembly being relatively compact in size and light in weight to adapt it for use in connection with air refrigerating systems of aircraft.

Further objects and advantages will be apparent from the following specification and from the drawing, which is intended for the purpose of illustration only.

The single drawing is a diagrammatic view of the device for maintaining unrestricted flow of refrigerating air through a duct leading to the cabin or cockpit of an airplane, the device being shown in connection with the turbine discharge tube of an air refrigerating system, by way of example.

In order to reduce the power required to operate the primary compressor in turbine cooling systems, it is often desirable to reduce the turbine air flow and increase the temperature drop in the turbine proportionately. This, however, leads to turbine outlet temperatures at which ice often forms in the turbine outlet. Unless provision is made for removing this ice immediately, it tends to build up on the sides of the outlet duct and increases the back pressure on the turbine, thereby reducing the temperature drop and producing an effective cooling which is only as great as that which would be produced if the turbine outlet temperature had not dropped below 32° F. dry bulb temperature. In the device or apparatus to be next described, this ice is first converted to water, as much of the water as is in excess of that required to provide the desired humidity for the cabin or other compartment being subsequently removed from the turbine discharge duct by a water separator located in said duct and constituting a component of the device.

Referring to the drawing in detail, the reference character 5 designates an aircraft cabin or other compartment, through the interior of which it is desirable to circulate refrigerated air for the purpose of cooling the same so as to effect maximum comfort for the passengers and crew of the airplane or the desired temperature and humidity in the case of a cargo carrying craft. The air refrigerating system, a portion only of which is herein illustrated, may include a turbine 6 of any suitable type. As is usual in air refrigerating systems for aircraft, compressed air is derived from a compressor and intercooler or other source (not shown) and flows through a duct 7 and thence through the turbine 6 where its pressure and temperature are lowered, the work extracted by the turbine being transmitted through the shaft 8 to a work absorption means, such as a fan for forcing the air through the intercooler; this means not being shown in the drawing. The cooled air, which often contains subcooled water, and in many instances ice, flows through the turbine discharge duct 10 to an ejector-mixer, or aspirating orifice, indicated at 11. Refrigerated air flowing through the duct 10 enters a larger, intermediate cold air duct 12 which, in turn, is enclosed by a still larger, outer duct 13 which enters the cabin 5 to circulate the refrigerated air therethrough.

An air duct or conduit 15 extends from the cabin 5 and is connected to the outer duct 13. The conduit 15, through which warm air can be recirculated through the system, may have a circulating fan 16 therein and may also have an air filter 17 of any suitable type. In some installations of the air refrigerating system, neither the fan 16 nor filter 17 may be necessary to the successful performance of the system.

The cold air duct 12 is provided with a peripheral flange 19, a portion of which extends into the duct 15. The flange 19 serves as a partition and divides the annular space between the two ducts 12 and 13 into a pair of axially spaced annular passages 20 and 21, either or both of these passages, depending upon the conditions, serving to conduct the warm air flowing through the duct 15. The outer end of the duct 12, that is, the end disposed adjacent the turbine 6, surrounds the turbine discharge duct 10 in spaced relation thereto, thereby providing an annular passage 22 therebetween. An annulus 23, of semicircular cross section, serves as a deflector for guiding warm air flowing through the annular passage 20 into the annular passage 22. An air flow regulating valve 25 is disposed within the duct 15 adjacent the end of the partition 19, this valve being operated by an actuator 26. The valve is adapted to be actuated to cause the warm air to flow through either or both of a pair of branches 24 and 24' of the duct 15 leading to the respective annular passages 20 and 21.

Disposed within the duct 12 at its downstream end is a water separator unit 27 which may be of any suitable type capable of separating entrained water from the air flowing through this duct into the duct 13 and into the cabin 5. Water removed from the air by the separator unit 27 is adapted to flow through a tube 28 into a receptacle 29 and to be subsequently drawn from the receptacle through a tube 30 by an aspirating nozzle 31 within the duct 13, compressed air flowing from the duct 7 through a tube 32 and thence through the nozzle to produce the aspirating action. The receptacle 29 is provided with an overflow tube 29' through which excess water in the receptacle can discharge. By this means, the refrigerated air entering the cabin is humidified, if necessary. A thermostat 33 is located in the duct 12 just upstream of the water separator unit 27 and is adapted to control the operation of the actuating means 26 for the valve 25. It is to be understood that when the humidity of the air is unimportant, the water separator 27 and receptacle 29 can be dispensed with.

Located within the cabin 5 is a humidistat 35 which is adapted to energize an actuator means 36 which controls the opening and closing of a valve 37 within the tube 32. The humidistat 35 also functions to energize another actuating means 39 which controls the opening and closing of a by-pass valve 40 within the duct 12 adjacent the water separator unit 27.

The device for maintaining unrestricted flow of the refrigerated air to the cabin or cockpit of an aircraft functions in the manner next explained. Air from the compressor and intercooler, or other source, enters the system at 7 and passes through the turbine 6 where its temperature and pressure are substantially lowered. This cooled air, which may contain subcooled water, or ice, or a mixture of the same, flows through the turbine discharge duct 10 to the ejector-mixer 11.

As indicated previously, the cool air discharged by the turbine 6 flows through the ducts 10, 12 and 13 and enters the cabin or other compartment 5. Recirculated air, drawn from the compartment 5 by the fan 16, passes through the air filter 17 and the warm air conduit 15 to the regulating valve 25. A portion of this warm air flows through the branch 24; the annular passages 20 and 22 to the ejector-mixer or aspirating orifice 11 where it is drawn into the duct 12 and mixed with the cold air discharged from the turbine through its duct 10. Since the air entering at 22 is warmer than the air entering at 10, any ice particles or ice fog in the turbine discharge air are melted in the duct 12. It is thus seen that the ice fog and ice particles are melted and the accretion of the same on the sides of the air ducts 10 and 12 is prevented, and this is accomplished by warming the sides of the ducts and mixing warm air with the supersaturated air in order to create a beneficial condition wherein the submicroscopic and discrete ice fog and ice particles are converted to water by the warm air and coalescence of the submicroscopic fog and discrete water particles may occur before they encounter the wetted surface of the water separator. The water formed by this melting process, or a substantial percentage of it, collects on the water separator 27 and drains through the tube 28 into the receptacle 29.

The air, with all or a portion of the entrained moisture removed, flows through a second ejector-mixer 42 where it is mixed with the balance of the recirculated air flowing through the branch 24' of the duct 15 and through the passage 21, thereby producing air at the required conditions, preferably unsaturated at the location 43 where the air enters the cabin 5.

The thermostat 33 is so adjusted that when an air temperature of 32° F., or lower, exists adjacent that portion of the duct 12 adjacent the thermostat, the actuating means 26 is operated to move the valve 25 to a position wherein all the recirculated air flows through the passage 20, since all this air is needed to melt the ice formed by the turbine 6. The thermostat 33 is also adjusted so that, for an air temperature of, say 37° F. adjacent the thermostat, all the recirculated air flows through passage 21, since under this condition no ice will form, and the addition of heat upstream of the water separator unit 27 would decrease the efficiency of the water separator by lowering the quantity of entrained moisture. In order to prevent the deposition of ice on the ducts 10 and 12, the duct 12 is provided with fins 44 on its exterior, thus insuring that the walls of the ducts will be well warmed by the recirculated air within the passage 20.

Under conditions when no ice exists at the turbine discharge outlet, passage 20 will be closed and the water separator will function in the normal manner. The recirculated air then flowing through the annular passage 21 may be mixed with the turbine-cooled air to produce a mixture of unsaturated air which prevents local fogging in the cabin. Regulation of the water separator effectiveness may be accomplished either by use of the valve controlled by-pass opening 45 or by reintroducing water into the air stream by means of the humidifier 30, 31, or by both means.

If the humidity within the cabin or compartment 5 falls below a predetermined value, the humidistat 35 functions to energize the actuator 39 to open the by-pass valve 40 which then permits air, which has not been dehumidified, to by-pass the water separator. If this action does not produce sufficient humidity in the compartment 5, the humidistat 35 energizes the actuator 36 which then opens valve 37. In this manner a relatively small quantity of air at relatively high pressure flows from duct 7 through the tube 32 to the aspirator 31 where it acts to draw water from the receptacle 29 through the tube 30 and spray it into the duct 13 connected to the compartment, thereby humidifying the air entering the compartment. The valves 25, 37 and 40 are capable of modulating in accordance with the conditions. For example, valve 25 may assume a position between fully open for passage 24 and fully open for passage 24', in response to temperature signals received from the thermostat 33. Likewise, valves 37 and 40 will respectively modulate the flow of air in the tube 32 and the amount of air by-passing the separator 27 in response to signals received from the humidistat 35.

It is within the concept of this invention to so form the ejector-mixers 11 and 42 that they may function as aspirating means for providing the motive power for the air recirculation cycle, thereby eliminating the need for the recirculating fan.

It will be apparent that recirculated cabin air is not necessary to the operation of the present device under all flight conditions. If warm ambient air is available for the purpose, it is possible to substitute such air for the recirculated cabin air to achieve the desired de-icing. This substitution is only possible, of course, when the cabin is unpressurized, as for example, during ground cooling or during flight of the aircraft in the unpressurized range. It is apparent, however, that a source of warm air at any pressure higher than that of the cabin or compartment may be utilized, e. g., ram air, bleed-off air from a turbo-compressor, etc.

In its broadest aspect, our invention resides in the provision of means for warming the walls of the discharge duct of a turbine, supercharger or other cooling medium which functions to expand the discharged air so as to reduce its temperature substantially below ambient values, the invention further providing means for heating the discharged air by mixing therewith air of higher temperature, the result being to raise the temperature of the air to a value above freezing temperature so that ice particles contained in the discharged cooling air are melted. By this means, the ice particles, or ice fog, are prevented from accumulating on the inner surfaces of the discharge duct to create a back pressure which, as will be apparent, would reduce the temperature drop and result in inefficiency of the air refrigerating system or apparatus with which the turbine or supercharger is associated.

It is thus seen that the invention provides means for positively preventing accretion of ice particles within a cold air duct, and that this means includes (a) means for melting the ice which collects on the inside surfaces of the duct and (b) means for mixing warm air with the cold air either at the aspirator or downstream in order that the entrained ice and ice fog will be melted. As will be apparent to one versed in the art, the source of the warm air is not important and it is immaterial whether the cold supersaturated air aspirates the warm air, or vice versa. It is within the concept of this invention to introduce warm air of a higher pressure than the cold air into the de-icer means through the duct 10, in which case the turbine outlet air would be led into the passage 22 to be aspirated by the warm air.

Secondary to the broad concept as discussed above, the invention further provides means, disposed downstream from the air refrigerating means, for separating all or a portion of the water from the cooled air flowing through the duct, so as to vary the humidity of the refrigerated air discharged from the duct in accordance with requirements. As a further feature of the present invention, automatic means are provided for causing some of the air to by-pass the water separating means, the by-pass means being controlled by humidistat means. As previously explained, it is a matter of choice as to the source of the warm air employed for de-icing purposes. However, when the refrigerated air is employed as a medium for conditioning the air of an aircraft cabin or other compartment, air in the compartment can be utilized for the purpose, the present invention disclosing means for recirculating a portion of the compartment air.

It will be observed from the foregoing that the present invention provides, in addition to duct de-icing means, an efficient means for maintaining unrestricted flow of the refrigerated air to an aircraft cabin or other compartment at predetermined temperatures and humidity. The device is particularly adapted for use in aircraft which are operated under climatic conditions of relatively high temperatures and humidities, as are common in the tropics at altitudes up to approximately 15,000 feet. By the use of the present device, the accretion of entrained ice particles and ice fog in the turbine discharge duct of an air refrigerating system is prevented. As a feature of novelty, the present device functions to remove the entrained ice particles and ice fog by converting the same into water by a melting process, and subsequently removing the water from the air stream by means of a separator. The device also embodies means for maintaining the cooling energy loss of the air at a minimum. In one form of the apparatus, a selected portion of the ventilation air introduced into the cabin is recirculated through the apparatus as a means to impart to the ice particles and ice fog the latent heat of fusion necessary to melt them. The present device also embodies means for reinjecting into the air at a point downstream from the water separator such amounts of water as are necessary to maintain controlled conditions of humidity within the cabin or other compartment.

We claim as our invention:

1. Means for maintaining unrestricted flow of refrigerated air through an air flow duct, comprising: an outer fluid conduit surrounding said air flow duct and defining therewith a space through which a heating fluid can flow in contact with said air flow duct so as to warm the walls of said duct to prevent ice particles occurring in the refrigerated air from accumulating on the inner walls of the duct, there being an opening in said duct through which the heating fluid can flow from said conduit into the duct to mix with the refrigerated air so as to provide the latent heat of fusion necessary to melt discrete ice particles and ice fog in the refrigerated air.

2. Means for maintaining unrestricted flow of refrigerated air through an air flow duct, comprising: an outer fluid conduit surrounding said air flow duct and defining therewith a space through which a heating fluid can flow in contact with said air flow duct so as to warm the walls of said duct to prevent ice particles occurring in the refrigerated air from accumulating on the inner walls of the duct, there being an aspirating orifice in the duct so that the heating fluid is drawn into the duct to mix with the refrigerated air so as to provide the latent heat of fusion necessary to melt discrete ice particles and ice fog in the refrigerated air.

3. In combination with a device for expanding air to reduce the temperature thereof to substantially freezing, said device including a discharge duct through which the cooled air is discharged: a conduit surrounding the discharge duct and defining therewith a space through which a heating fluid can flow in contact with the duct so as to warm the walls of the duct to prevent the accumulation of ice particles and ice fog occurring in the cold air thereon, there being an opening in the duct through which the heating fluid can enter the duct to mix with the cold air, the heating fluid providing the latent heat of fusion necessary to melt the discrete ice particles and ice fog occurring in the discharged cold air.

4. In combination with a device for expanding air to reduce the temperature thereof to substantially freezing, said device including a discharge duct through which the cooled air is forcibly discharged: a conduit surrounding the discharge duct and defining therewith a space through which a heating fluid can flow in contact with the duct so as to warm the walls of the duct to prevent the accumulation of ice particles and ice fog occurring in the cold air thereon, there being an aspirating orifice in the duct through which the heating fluid can be drawn into the duct to mix with the cold air, the heating fluid providing the latent heat of fusion necessary to melt the discrete ice particles and ice fog occurring in the discharged cold air.

5. In combination with a duct through which air at approximately freezing temperature can flow: a conduit surrounding the duct and defining therewith a space through which a heating fluid can flow in contact with the duct so as to warm the walls of the duct to prevent the accumulation of discrete ice particles and ice fog occurring in the cold air thereon, there being an aspirating orifice in the duct through which the heating fluid can be drawn into the duct by a low pressure area created by the cold air passing across said orifice, said heating fluid providing the latent heat of fusion necessary to melt the discrete particles of ice and ice fog occurring in the discharged cold air.

6. In combination with a duct through which air at approximately freezing temperature can flow: a conduit surrounding the duct and defining therewith a space through which a heating fluid can be forced in contact with the duct so as to warm the walls of the duct to prevent accumulation of discrete ice particles and ice fog occurring in the cold air thereon, there being an aspirating orifice in the duct through which the heating fluid can be forced into the duct, the flow of the heating fluid through said orifice creating a low pressure area adjacent said orifice tending to draw the cold air through said duct, said heating fluid providing the latent heat of fusion necessary to melt the discrete particles of ice and ice fog occurring in the discharged cold air.

7. In combination with an air refrigerating system for introducing refrigerated air into a compartment and including refrigerating means operative to reduce the temperature of air delivered thereto and to discharge said refrigerated air into a cold air duct communicating with the interior of the compartment: means for introducing air of higher temperature than the discharged air into said duct to impart to any ice particles therein the latent heat of fusion capable of melting the particles; a water separating means disposed in said duct downstream from the point of entrance of said air of higher temperature and adapted to remove the water formed by said melting process so as to dehumidify the air entering the compartment; and humidifying means for introducing water into said air within said duct, downstream from said water separating means.

8. In combination with an air refrigerating system for introducing refrigerated air into a compartment and including a refrigerating means operative to reduce the temperature of air delivered thereto and to discharge said refrigerated air into a cold air duct communicating with the interior of the compartment: means for introducing air of higher temperature than the discharged cold air into said duct to impart to any ice particles therein the latent heat of fusion capable of melting the particles; a water separating means disposed in said duct downstream from the point of entrance of said air of higher temperature and adapted to remove the water formed by said melting process so as to dehumidify the air entering the compartment; and means for injecting into the air within said duct, at a point downstream from said water separating means, at least a portion of the water separated from the air by said separating means.

9. In combination with an air refrigerating system for introducing refrigerated air into a compartment and including refrigerating means operative to reduce the temperature of air delivered thereto and to discharge said refrigerated air into a cold air duct communicating with the interior of the compartment: means for introducing air of higher temperature than the discharged cold air into said duct to impart to any ice particles therein the latent heat of fusion capable of melting the particles; a water separating means disposed in said duct downstream from the point of entrance of said air of higher temperature and adapted to remove the water formed by said melting process so as to dehumidify the air; and means responsive to variations in the humidity of the air within the compartment for injecting into the air within said duct, at a point downstream from said water separating means, at least a portion of the water separated from the air by said separating means.

10. In combination with an air refrigerating system for introducing refrigerated air into a compartment and including refrigerating means operative to reduce the temperature of air delivered thereto and to discharge said refrigerated air into a cold air duct communicating with the interior of the compartment: means for introducing air of higher temperature than the discharged cold air into said duct to impart to any ice particles therein the latent heat of fusion capable of melting the particles; a water separating means disposed in said duct downstream from the point of entrance of said air of higher temperature and adapted to remove the water formed by said melting process so as to dehumidify the air; a receptacle for receiving the water separated from the air by said separator; and aspirating means for drawing water from said receptacle and injecting the same into the air stream at a point downstream from said separating means.

11. In combination with an air refrigerating system for introducing refrigerated air into a compartment and including refrigerating means operative to reduce the temperature of air delivered thereto and to discharge said refrigerated air into a cold air duct communicating with the interior of the compartment: means for introducing air of higher temperature than the air discharged into said duct to impart to any ice particles therein the latent heat of fusion capable of melting the particles; a water separating means disposed in said duct downstream from the point of entrance of said air of higher temperature and adapted to remove at least a portion of the water formed by said melting process so as to dehumidify the air; a receptacle for receiving the water separated from the air by said separator; and aspirating means responsive to variations in the humidity of the air within the compartment for drawing water from said receptacle and injecting the same into the air stream at a point downstream from said separating means.

12. The combination defined in claim 11 in which said aspirating means includes: a tube connected to a source of compressed air and provided with a nozzle disposed in said duct; and a line extending from said receptacle into said nozzle.

13. The combination defined in claim 7 and including by-pass means operative to permit the air discharged from the refrigerating means to by-pass said water separating means.

14. The combination defined in claim 7 and including by-pass means operative in response to variations in the humidity of the air within the compartment to permit air discharged from the refrigerating means to by-pass said water separating means.

15. The combination defined in claim 7 in which a by-pass opening is provided between said duct and said separator means and including a valve operative in response to variations in the humidity of the air within the compartment to permit air discharged from the refrigerating means to by-pass said water separating means.

16. The combination defined in claim 7 and including means responsive to variations in the temperature of the air in said duct between the refrigerating means and said water separating means for controlling the introduction of said air of higher temperature into said duct.

17. The combination as defined in claim 7 in which said air introducing means comprises: a warm air conduit communicating with the interior of said cold air duct adjacent the discharge end of the refrigerating means; a valve movable within said warm air conduit; and means responsive to variations in the temperature of the air in said cold air duct between the refrigerating means and said water separating means for controlling the quantity of warm air introduced into said cold air duct.

18. In combination with an air refrigerating system for introducing refrigerated air into a compartment and including refrigerating means operative to reduce the temperature of air delivered thereto and to discharge said cooled air into a cold air duct communicating with the interior of the compartment: a warm air conduit having a pair of branches through which warm air can flow, the first of said branches communicating with the interior of said cold air duct adjacent the discharge end of the refrigerating means and the second of said branches communicating with the interior of said cold air duct downstream therefrom, warm air introduced into said cold air duct through said first branch imparting to ice particles within said cold air duct the latent heat of fusion capable of melting the particles; a water separating means disposed in said cold air duct between the points of communication of said branches and adapted to remove water formed by said melting process so as to dehumidify the air; and a valve in said warm air duct operable in response to variations in the temperature of the air in said cold air duct, upstream from said water separating means, for automatically controlling the amount of warm air introduced into said cold air duct through either of said branches.

19. In combination with an air refrigerating system for introducing refrigerated air into a compartment and including a refrigerating means operative to reduce the temperature of air delivered thereto, said means having a discharge duct: a cold air duct axially aligned with said discharge duct and having an end surrounding the same in spaced relation thereto to provide a first annular air passage therebetween, said cold air duct receiving and conducting cold air discharged by the refrigerating means; an outer air duct surrounding said cold air duct in spaced relation thereto and having an end communicating with the interior of the compartment through which air discharged from the refrigerating means can enter the compartment, one end of said cold air duct cooperating with said discharge duct to define a first annular ejector-mixer therebetween, said outer duct cooperating with the other end of said cold air duct to define a second annular ejector-mixer therebetween; a partition between said cold air duct and said outer duct and disposed between said first and second ejector-mixers and dividing the space between said cold air duct and said outer duct into two annular passages, the first of said passages leading to said first ejector-mixer and the second of said passages leading to said second ejector-mixer; a warm air conduit having a first branch communicating with said first passage and a second branch communicating with said second passage, warm air in said passages being adapted to flow into the cold air stream at said ejector-mixers, the warm air entering said cold air duct through said first ejector-mixer imparting to any ice particles within said cold air duct the latent heat of fusion capable of melting the particles; a water separating means disposed in said cold air duct between said first and second ejector-mixers and adapted to remove water formed by said melting process so as to dehumodify the air entering the compartment; and a valve in said warm air conduit operable in response to variations in the temperature of the air in said cold air duct, upstream from said water separating means, for controlling the amount of warm air passing through said branches.

20. The combination defined in claim 19 in which said warm air conduit communicates with the interior of the compartment and is adapted to recirculate air introduced into the compartment for the purpose of melting the ice particles within said cold air duct.

21. The combination defined in claim 20 and including air propelling means and air filtering means within said warm air conduit.

22. In an air refrigerating system for introducing refrigerated air into a compartment and including: a refrigerating means operative to reduce the temperature of air delivered thereto and to discharge said refrigerated air, and a duct extending between the discharge end of said refrigerating means and the interior of the compartment through which the cooled air is delivered to the interior of the compartment, the combination of: means for introducing air of higher temperature than the discharged refrigerated air into said duct to impart to any ice particles therein the latent heat of fusion capable of melting the particles; a water separating means disposed in said duct downstream from the point of entrance of said air of higher temperature and adapted to remove water formed by said melting process so as to dehumidify the air; and means responsive to variations in the humidity of the air in the compartment for reinjecting water separated from the air stream by said water separating means into the air downstream from said water separating means.

23. The combination defined in claim 19 in which said outer warm air conduit surrounds said discharge duct and defines therewith an annular space through which the warm air passes to said first ejector-mixer and contacts said discharge duct to warm the walls thereof so as to melt ice particles tending to accumulate thereon.

24. In combination with an air refrigerating system for conveying refrigerated air and including refrigerating means operative to reduce the temperature of air delivered thereto, said refrigerating means having a discharge duct through which said refrigerated air is discharged: a cold air duct having an end surrounding said discharge duct and providing an annular passage therebetween, said cold air duct being adapted to receive the refrigerated air discharged from said refrigerating means; and a conduit surrounding said end of said cold air duct in spaced, concentric relation thereto, through which air of higher temperature than the discharged air can flow into said annular passage and said cold air duct to impart to any discrete ice particles therein the latent heat of fusion capable of melting the particles.

PAUL C. SCOFIELD.
FREDERICK H. GREEN.

REFERENCES CITED

The following references are of record in the file of this patent:

UNITED STATES PATENTS

| Number | Name | Date |
|---|---|---|
| 1,727,669 | Perryman | Sept. 10, 1929 |
| 2,391,838 | Kleinhans | Dec. 25, 1945 |
| 2,409,159 | Singleton | Oct. 8, 1946 |
| 2,473,496 | Mayer | June 14, 1949 |
| 2,518,246 | Morris | Aug. 8, 1950 |
| 2,519,531 | Worn | Aug. 22, 1950 |